United States Patent
Nishikawa

(10) Patent No.: US 7,283,449 B2
(45) Date of Patent: Oct. 16, 2007

(54) BEAM SPLITTING SYSTEM AND OPTICAL INFORMATION READ/WRITE DEVICE

(75) Inventor: Hiroshi Nishikawa, Saitama-ken (JP)

(73) Assignee: PENTAX Corporation, Tokyo (JP)

( * ) Notice: Subject to any disclaimer, the term of this patent is extended or adjusted under 35 U.S.C. 154(b) by 553 days.

(21) Appl. No.: 10/854,159

(22) Filed: May 27, 2004

(65) Prior Publication Data

US 2004/0264341 A1 Dec. 30, 2004

(30) Foreign Application Priority Data

May 28, 2003 (JP) ............................. 2003-150300

(51) Int. Cl.
*G11B 7/00* (2006.01)
(52) U.S. Cl. .............................. 369/112.01; 369/112.08
(58) Field of Classification Search ........... 369/112.01, 369/103, 112.02, 112.23, 44.32, 44.23, 44.24, 369/112.03, 112.08, 112.1
See application file for complete search history.

(56) References Cited

U.S. PATENT DOCUMENTS 7,020,055 B2 * 3/2006 Kim et al. ............... 369/44.41

2002/0054554 A1 5/2002 Yamanaka
2002/0093744 A1 7/2002 Yamamoto et al.

FOREIGN PATENT DOCUMENTS

JP 2002-150569 5/2002
JP 2002-150598 5/2002

* cited by examiner

*Primary Examiner*—Nabil Hindi
(74) *Attorney, Agent, or Firm*—Greenblum & Bernstein, P.L.C.

(57) ABSTRACT

A light beam splitting element that splits a beam incident on a beam receiving surface into a plurality of beams. The beam receiving surface has at least one predetermined area that directs a portion of the incident beam to proceed in a predetermined direction, the portion of the beam incident on the one predetermined area being insusceptible to spherical aberration. Further, the beam receiving surface has at least another predetermined area that directs another portion of the incident beam to proceed in another predetermined direction, the another portion of the beam incident on the another predetermined area being susceptible to spherical aberration.

20 Claims, 9 Drawing Sheets

BEAM SPLITTING SYSTEM AND OPTICAL INFORMATION READ/WRITE DEVICE

BACKGROUND OF THE INVENTION

The present invention relates to a beam splitting system for splitting a light beam into a plurality of light beams and an optical information read/write device (for reading/writing optical information from/to an optical disc) that employs the beam splitting system.

In optical information read/write devices which read/write information from/to an optical disc, a laser beam is generally incident on the optical disc (record medium).

The data density of optical discs is increasing more and more in recent years and a variety of optical record mediums according to various standards are being proposed. Conditions for raising the data density of an optical disc may include: shortening of the wavelength of a laser diode (semiconductor laser) as the light source, increase of the NA (Numerical Aperture) of the object lens which converges the laser beam on a pit formed on the optical disc, etc. Satisfying the two conditions make it possible to irradiate the optical disc with a beam spot of a smaller diameter compared to the cases of conventional devices, by which information processing can be carried out even when smaller pits are formed on the optical disc, that is, high data density of the optical disc can be realized.

However, as the wavelength of the laser diode gets shorter and the NA of the object lens gets higher as seen in recent years, the convergent angle of the laser beam focusing on the recording surface of the optical disc is getting larger and ill effects of various aberrations become more intense. Consequently, it becomes difficult to apply the beam spot to a pit formed on the optical disc with high accuracy.

The thickness of the cover layer (protective layer) on the data recording surface of the optical disc varies from disc to disc, and the cover layer thickness may fluctuate even in a single optical disc. Therefore, wavefront aberration (mainly, spherical aberration) is caused by the variation/fluctuation of the cover layer thickness on the data recording surface and the quality of reproduced signals is necessitated to be deteriorated.

As a countermeasure against the problem, an optical information read/write device that detects the spherical aberration occurring on the optical disc surface and actively corrects the spherical aberration (caused by the aforementioned variation/fluctuation of the cover layer thickness and manufacturing error of lenses) by use of a spherical aberration correction optical system such as an expander lens has been proposed and has become widely known. An example of which is disclosed in Japanese Patent Provisional Publication No. P2002-150569.

However, in the case where the spherical aberration is detected by use of a photoreceptor, etc., a signal representing the spherical aberration to be detected can hardly be distinguished from the focusing error signal, and subsidiary criteria become necessary for detecting the spherical aberration signal and the focusing error signal making a clear distinction between the signals. In conventional techniques, for example, the spherical aberration correction and focusing operation are carried out based on measurements of moving distances of the object lens and a lens group of the spherical aberration correction optical system, or the spherical aberration correction is conducted based on a previously measured profile (thickness errors, etc.) of the optical disc (e.g. Japanese Patent Provisional Publication No. P2002-150598).

However, the employment of the subsidiary criteria for distinguishing between the spherical aberration signal and the focusing error signal as above (setting parameters for the criteria, etc.) is a troublesome task for the manufacturer. Further, the spherical aberration correction process by reading out the previously measured profile of the optical disc does not include a real-time measurement of the spherical aberration. Therefore, the method can not properly cope with wavelength variations of the laser diode, etc. in cases where the optical information read/write device is susceptible to aberrations due to its short-wavelength laser diode and high NA object lens, by which the spherical aberration correction and focusing operation can not be carried out correctly and precisely.

SUMMARY OF THE INVENTION

The present invention is advantageous in that an improved optical information read/write device is provided, which makes it possible to detect the spherical aberration signal and the focusing error signal making a clear distinction between them, without the need of employing subsidiary criteria.

According to an aspect of the present invention, there is provided with a light beam splitting element that splits a beam incident on a beam receiving surface into a plurality of beams. The beam receiving surface has at least one predetermined area that directs a portion of the incident beam to proceed in a predetermined direction, the portion of the beam incident on the one predetermined area being insusceptible to spherical aberration, and at least another predetermined area that directs another portion of the incident beam to proceed in another predetermined direction, the another portion of the beam incident on the another predetermined area being susceptible to spherical aberration.

The beam splitting element maybe configured to allow light to pass therethrough, and the plurality of beams split by the light beam splitting element emerge therefrom in different directions, respectively.

Optionally, the at least one predetermined area and the at least another predetermined area are defined in accordance with third-order spherical aberration contained in the incident light beam, the third-order spherical aberration being expressed by a Zernike polynomial:

$$SA = 1 - 6\rho^2 + 6\rho^4,$$

where, $\rho$ denotes a normalized ray height with respect the optical axis of the light beam splitting element. The portion of the beam susceptible to the spherical aberration corresponds to non-extreme value of the polynomial, and the portion of the beam insusceptible to the spherical aberration corresponds to a vicinity of an extreme value of the polynomial.

Further optionally, the at least one predetermined area may include a first circular area surrounding the optical axis, and the at least another predetermined area may include a second annular area surrounding the first circular area.

Furthermore, the at least one predetermined area may further include a third annular area surrounding the second annular area; and the at least another predetermined area may further include a fourth area surrounding the third circular area.

According to another aspect of the invention, there is provided an optical unit employed in an optical information read/write device for reading/writing information from/on an optical disc. The optical unit may include a light source that emits a laser beam, an optical system that shapes and directs the laser beam emitted by the light source to the optical disc, a beam splitting element provided to the optical system, a plurality of photo receptors, the laser beam reflected by the optical disc being received through the optical system, incident on the beam splitting element, the beam splitting element having a beam receiving surface and splitting the beam incident on the beam receiving surface into a plurality of beams. With this configuration, the beam receiving surface may have at least one predetermined area that directs a portion of the incident beam to proceed in a predetermined direction, the portion of the beam incident on the one predetermined area being insusceptible to spherical aberration, and at least another predetermined area that directs another portion of the incident beam to proceed in another predetermined direction, the another portion of the beam incident on the another predetermined area being susceptible to spherical aberration.

Optionally, the plurality of photoreceptors may include at least one photoreceptor that receives the portion of the beam insusceptible to the spherical aberration, and at least another photoreceptor that receives the portion of the beam susceptible to the spherical aberration.

Further, the spherical aberration may be detected based on a signal is obtained in accordance with the output of the at least another photoreceptor.

In this case, a focusing error signal may be obtained in accordance with the output of the at least one photoreceptor. Further, a tracking error signal may also be obtained in accordance with the output of the at least one photoreceptor.

According to a further aspect of the invention, there is provided a light beam splitting system, comprising a plurality of areas surrounding an optical axis and having different diameters, the plurality of areas being formed such that an incident light beam that is incident on the light beam splitting system is divided into at least an beam composed of rays insusceptible to spherical aberration and other beam composed of rays susceptible to the spherical aberration.

Optionally, third-order spherical aberration contained in the incident light beam is expressed by a Zernike polynomial as:

$$SA = 1 - 6\rho^2 + 6\rho^4,$$

where, $\rho$ denotes a normalized ray height with respect the optical axis. The beam composed of rays insusceptible to the spherical aberration is a beam composed of rays that passed through one of the areas that corresponds to a vicinity of an extreme value of the polynomial, and the beam composed of rays susceptible to the spherical aberration is a beam composed of rays that passed through one of the areas that corresponds to non-extreme value of the polynomial.

Further optionally, the polynomial may have a first extreme value and a second extreme value, and the light beam splitting system splits the incident light beam into a beam composed of rays that passed through a first area that corresponds to a vicinity of the first extreme value of the polynomial, a beam composed of rays that passed through a second area that corresponds to a vicinity of the second extreme value of the polynomial, and two beams composed of rays that passed through areas corresponding to non-extreme values of the polynomial, respectively.

According to another aspect of the invention, there is provided an optical information read/write device for reading/writing optical information by leading a light beam emitted by a light source into a recording surface of an optical disc, which is provided with a light beam splitting system including a plurality of areas surrounding an optical axis with different diameters, the plurality of areas being formed such that an incident light beam that is incident on the light beam splitting system is divided into at least an beam composed of rays insusceptible to spherical aberration and other beam composed of rays susceptible to the spherical aberration, the beam and the other beam proceeding in different directions, and at least two photoreceptors which receive the beams split by the light beam splitting system to proceed in different directions, respectively.

Optionally, at least one of the photoreceptors receives the beam composed of rays insusceptible to the spherical aberration a focusing error of the light beam emitted by the light source with respect to the recording surface of the optical disc being detected in accordance with the output of the at least one photoreceptors corresponding to the beam composed of rays insusceptible to the spherical aberration, and at least another one of the photoreceptors receives the beam composed of rays susceptible to the spherical aberration, the spherical aberration of the light beam emitted by the light source occurring on the recording surface of the optical disc being detected in accordance with the output of the at least another one of the photoreceptors corresponding to the beam composed of rays susceptible to the spherical aberration.

Further, third-order spherical aberration contained in the incident light beam is expressed by a Zernike polynomial as:

$$SA = 1 - 6\rho^2 + 6\rho^4,$$

where, $\rho$ denotes a normalized ray height with respect the optical axis. The beam composed of rays insusceptible to the spherical aberration is a beam composed of rays that passed through one of the areas that corresponds to a vicinity of an extreme value of the polynomial, and the beam composed of rays susceptible to the spherical aberration is a beam composed of rays that passed through one of the areas that corresponds to non-extreme value of the polynomial.

Still optionally, the polynomial has a first extreme value and a second extreme value, and the light beam splitting system splits the incident light beam into a beam composed of rays that passed through a first area that corresponds to a vicinity of the first extreme value of the polynomial, a beam composed of rays that passed through a second area that corresponds to a vicinity of the second extreme value of the polynomial, and two beams composed of rays that passed through areas corresponding to non-extreme values of the polynomial, respectively.

Further, the photoreceptors detect error signals by use of an astigmatic method, and two of the photoreceptors receive the two beams composed of rays that passed through the areas corresponding to the vicinities of the first and second extreme values of the polynomial, respectively, a focusing error signal being detected in accordance with output signals of the two photoreceptors.

Still optionally, the photoreceptors detect error signals by use of an astigmatic method, and two of the photoreceptors receive two beams composed of rays that passed through the areas corresponding to non-extreme value of the polynomial, respectively, the spherical aberration signal is detected in accordance with a difference between output signals of the two photoreceptors.

According to a furthermore aspect of the invention, there is provided a light beam splitting system comprising at least four areas surrounding an optical axis and having different diameters, wherein when a light beam is incident on the light beam splitting system, portions of the light beam respectively incident on different ones of the four areas are diffracted in different directions.

The at least four areas are defined in accordance with third-order spherical aberration contained in the incident light beam, the third-order spherical aberration being expressed by a Zernike polynomial:

$$SA=1-6\rho^2+6\rho^4,$$

where, $\rho$ denotes a normalized ray height with respect the optical axis of the light beam splitting element.

BRIEF DESCRIPTION OF THE ACCOMPANYING DRAWINGS

DETAILED DESCRIPTION OF THE EMBODIMENTS

Figure 1:
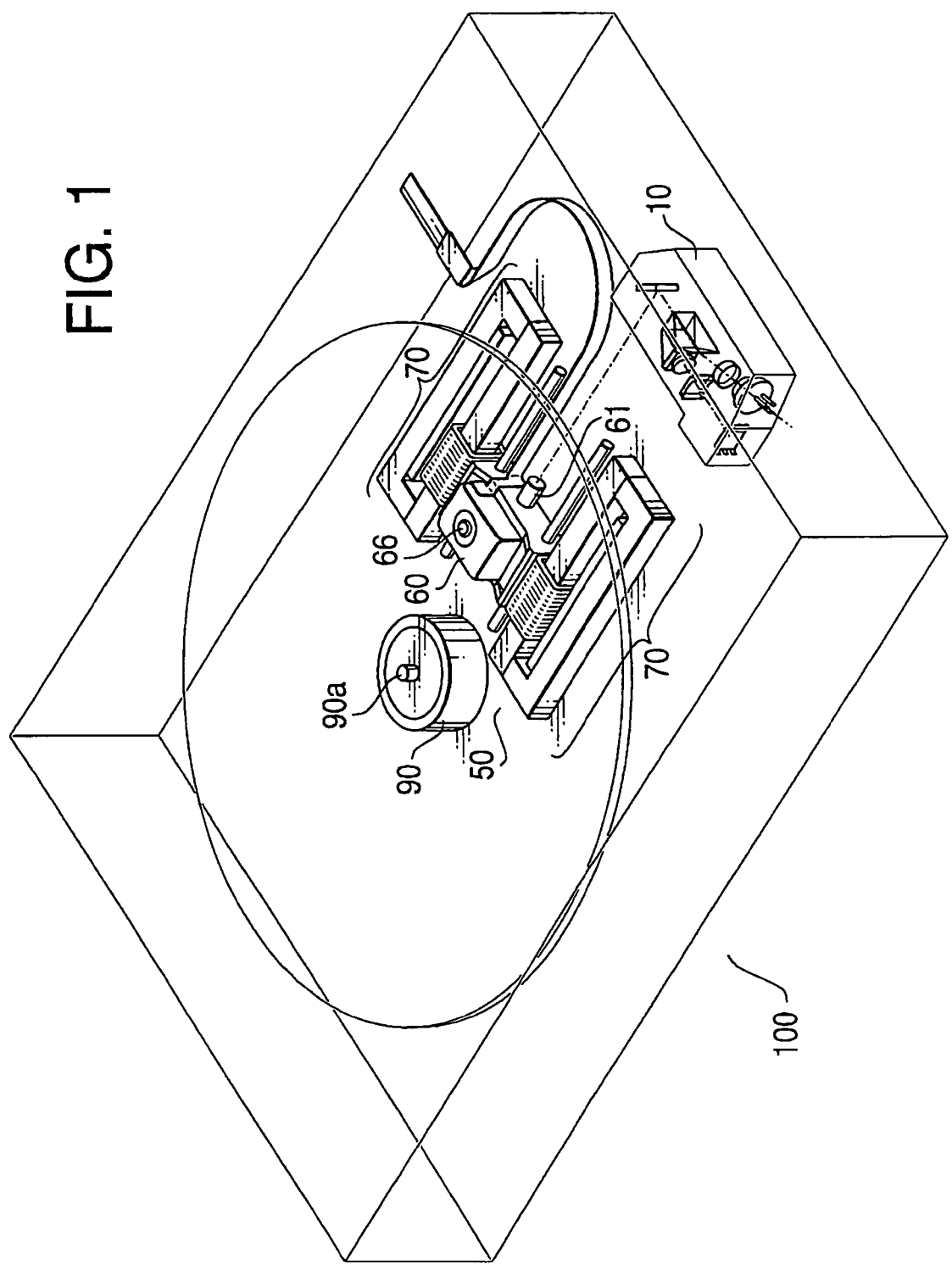
FIG. 1 is a perspective view showing the composition of an optical information read/write device in accordance with an embodiment of the present invention.

Referring now to the drawings, a description will be given in detail of preferred embodiments in accordance with the present invention.

FIG. 1 is a perspective view showing the composition of an optical information read/write device 100 in accordance with a first embodiment of the present invention. The optical information read/write device 100 includes an optical source unit 10, a pickup unit 50 and a spindle motor 90.

Figure 2:
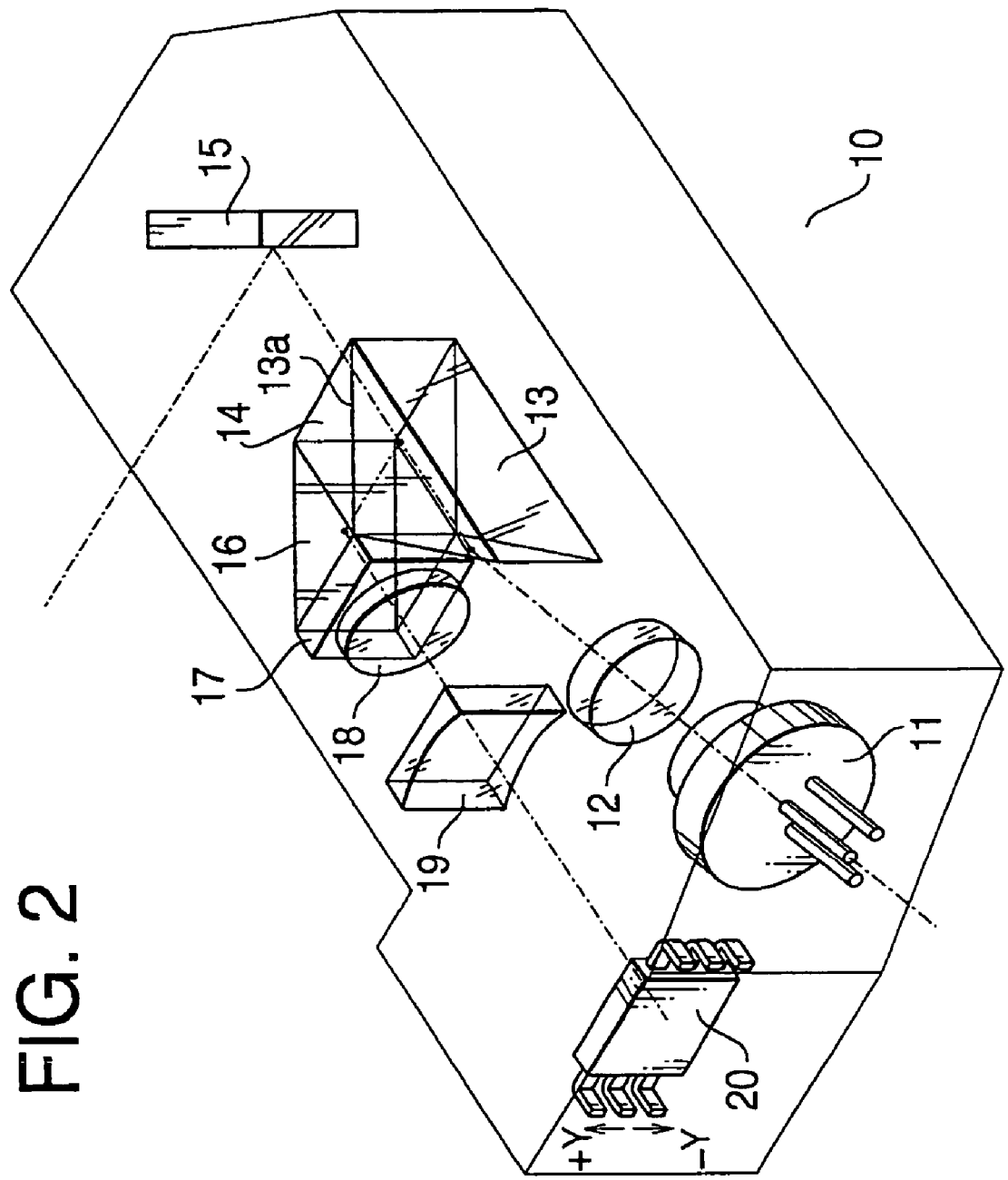
FIG. 2 is a perspective view showing the composition of an optical source unit of the embodiment.

FIG. 2 is an enlarged perspective view showing the structure of the optical source unit 10 of the first embodiment. The optical source unit 10 emits a laser beam, for reading/writing information from/to an optical disc 200 (see FIG. 3), to the pickup unit 50. The optical unit 10 reads digital information contained in a beam returned from the optical disc 200 and detecting error signals that are also included in the returned beam. The optical source unit 10 includes a laser diode 11, a collimating lens 12, a first anamorphic prism 13, a second anamorphic prism 14, a mirror 15, a rectangular prism 16, a hologram 17, a condensing lens 18, a cylindrical lens 19 and a composite sensor 20.

The laser diode 11 is a semiconductor laser that emits a diverging laser beam having an elliptical sectional form. The wavelength of the laser beam emitted by the laser diode 11 is approximately 400 nm. The diverging laser beam emitted by the laser diode 11 is incident on the collimating lens 12.

The collimating lens 12 transforms (collimates) the diverging laser beam emitted by the laser diode 11 into a light beam having parallel fluxes. The collimated beam is directed toward the first anamorphic prism 13.

The first and second anamorphic prisms 13 and 14 shape the parallel light beam emerging from the collimating lens 12 into a beam having a substantially circular sectional form. The shaped parallel light beam travels to the mirror 15. Part of the parallel light beam from the collimating lens 12 incident upon the first anamorphic prism 13 is deflected by a half mirror 13a by 90 degrees and thereby led to an unshown laser power monitoring sensor which detects intensity of the laser beam emitted by the laser diode 11.

The laser power monitoring sensor outputs an electric current that is proportional to the intensity of received light. By feeding back the output of the laser power monitoring sensor to an unshown laser power control circuit, the output power of the laser diode 11 can be servo-controlled and stabilized.

The mirror 15 deflects the parallel light beam emerging from the second anamorphic prism 14 by 90 degrees and thereby guides the parallel light beam to the pickup unit 50. Thereafter, the parallel light beam enters an SA (Spherical Aberration) correction lens unit 61 of a lens actuator unit 60 as shown in FIG. 1.

Figure 3:
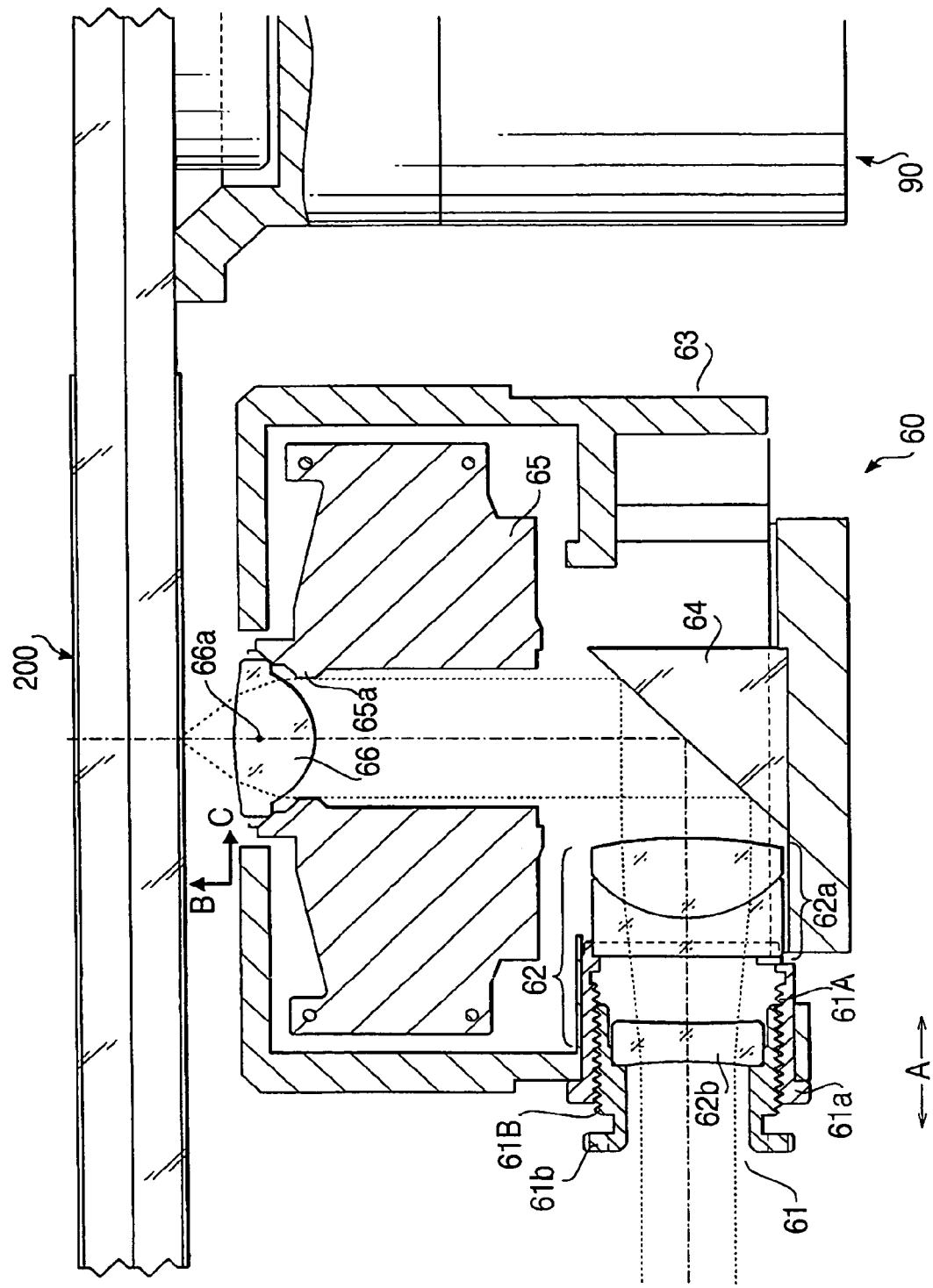
FIG. 3 is a cross-sectional view of a lens actuator unit of the embodiment.

FIG. 3 is across-sectional view of the lens actuator unit 60 of the first embodiment, taken along a plane containing the optical axis of the optical path between the optical source unit 10 and an object lens 66 shown in FIG. 1. The lens actuator unit 60 includes the SA correction lens unit 61, a carriage 63, a rectangular prism 64, a biaxial actuator 65 and the object lens 66.

The SA correction lens unit 61 includes a beam expander 62, which is an optical system for correcting the spherical aberration. In this embodiment, the beam expander 62 is composed of a first lens group 62a having a positive lens and a negative lens bonded together and a second lens group 62b made of a negative lens. The first lens group 62a is held by a first lens frame 61a, while the second lens group 62b is held by a second lens frame 61b. The first lens frame 61a is fixed to the carriage 63 (outer frame of the lens actuator unit 60). The first lens frame 61a and the second lens frame 61b are engraved with helicoids 61A and 61B and thereby engage with each other, by which the second lens frame 61b is allowed to move with respect to the first lens frame 61a in the direction of the arrow A shown in FIG. 3 (direction parallel to the optical axis of the beam expander 62).

Figure 4A:
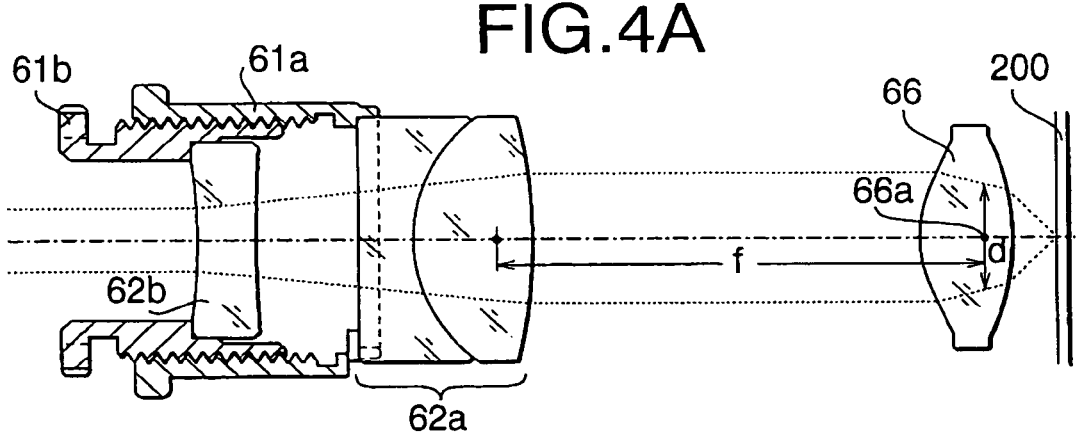
FIGS. 4A through 4C are schematic cross-sectional views showing several states of the light beam with various distances between a first lens group and a second lens group of the embodiment.
Figure 4B:
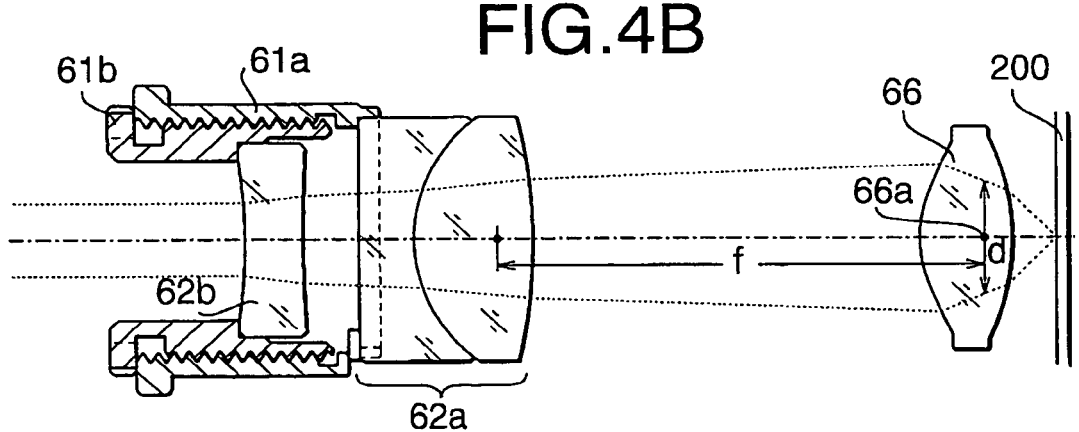
Figure 4C:
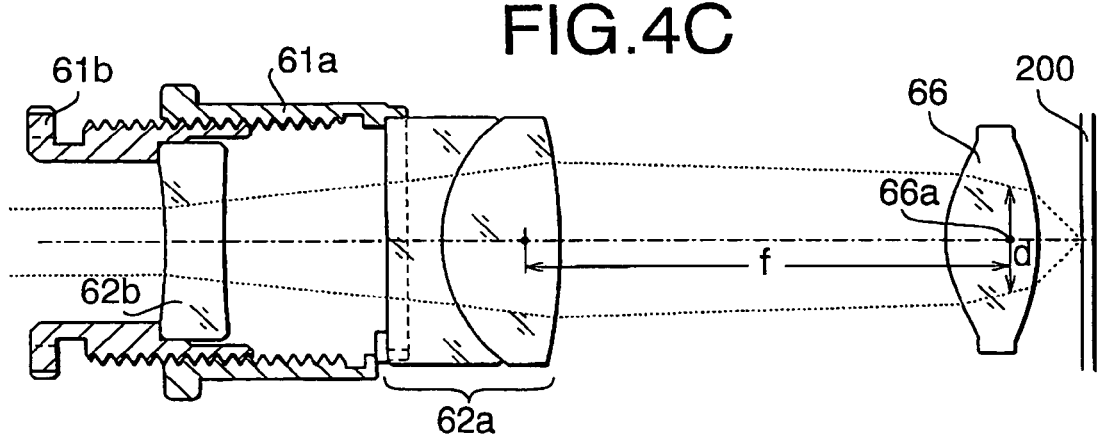

FIGS. 4A through 4C are schematic cross-sectional views showing several states of the light beam, with various distances between the first lens group 62a and the second lens group 62b. In FIGS. 4A through 4C, only the SA correction lens unit 61, the object lens 66 and the optical disc 200 are shown for the sake of simplicity. The distance between the first lens group 62a and the second lens group 62b changes as the second lens frame 61b moves in the direction of the arrow A (FIG. 3). When the second lens frame 61b is at a reference position (at a design distance) as shown in FIG. 4A, the beam expander 62 outputs the parallel light beam (supplied from the optical source unit 10) toward the object lens 66 as an expanded parallel light beam.

When a positive spherical aberration occurs on the recording surface of the optical disc due to a thickness error of the optical disc 200, for example, the second lens group 62b is moved from the reference position toward the first lens group 62a as shown in FIG. 4B, by which the beam expander 62 transforms the parallel light beam (supplied from the optical source unit 10) into a diverging beam and outputs the diverging beam toward the object lens 66. By the change of the light beam incident upon the object lens 66 from the parallel light beam to the diverging beam, the spherical aberration occurring at the object lens 66 decreases (changes in the minus direction) and thereby the spherical aberration on the recording surface of the optical disc can be corrected.

On the other hand, when a negative spherical aberration occurs on the recording surface of the optical disc, the second lens group 62b is moved from the reference position to be apart from the first lens group 62a as shown in FIG. 4C, by which the beam expander 62 transforms the parallel light beam (supplied from the optical source unit 10) into a converging beam and outputs the converging beam toward the object lens 66. In this case, the spherical aberration occurring at the object lens 66 increases (changes in the plus direction) and thereby the spherical aberration on the recording surface of the optical disc can be corrected.

The light beam emerging from the beam expander 62 is deflected by the rectangular prism 64 (which is fixed to the carriage 63) by 90 degrees and heads for the object lens 66. The object lens 66 is fixed to the biaxial actuator 65.

The biaxial actuator 65 moves the object lens 66 in two directions: a direction B (focus direction) parallel to the optical axis of the object lens 66 and a direction C (tracking direction) orthogonal to the optical axis of the object lens 66, depending on the result of measurement by the composite sensor 20 which will be explained later. The biaxial actuator 65 is provided with an aperture 65a in the vicinity of the object lens 66 (on the SA correction lens unit 61 side of the object lens 66). The aperture 65a, protruding from the biaxial actuator 65, has a function of controlling the diameter of the light beam incident upon the object lens 66 (fixed aperture).

As shown in FIGS. 4A-4C, the object lens 66 is placed so that its principal point 66a is at the focal point f of the first lens group 62a on its object lens 66 side. Therefore, the light beam incident upon the object lens 66 from the SA correction lens unit 61 always has a constant beam diameter d at the principal point 66a of the object lens 66 regardless of the state of the light beam shown in FIGS. 4A-4C. As a result, variations in the light quantity of a beam spot which is used for reading/writing data on the optical disc 200 can be suppressed almost perfectly and the profile (intensity distribution) of the beam spot can be maintained substantially constant, by which excellent read/write performance of the optical information read/write device 100 can be achieved.

The optical disc 200 is set on a stationary table and is spun by the spindle motor 90 around its rotation axis 90a. The rotation of the optical disc 200 enables the optical information read/write device 100 to read/write information from/to the optical disc 200. A linear motor unit 70 has a function of moving the lens actuator unit 60 in the tracking direction.

The incident light beam forming the beam spot on the optical disc 200 is reflected by the recording surface of the optical disc 200 and then reenters the optical source unit 10 via the lens actuator unit 60 as a returning beam. The returning beam is deflected by the mirror 15 by 90 degrees toward the second anamorphic prism 14, deflected by the half mirror 13a (provided between the first anamorphic prism 13 and the second anamorphic prism 14) by 90 degrees toward the rectangular prism 16, deflected by the rectangular prism 16 by 90 degrees, and then enters the hologram 17.

Figures 5A, 5B:
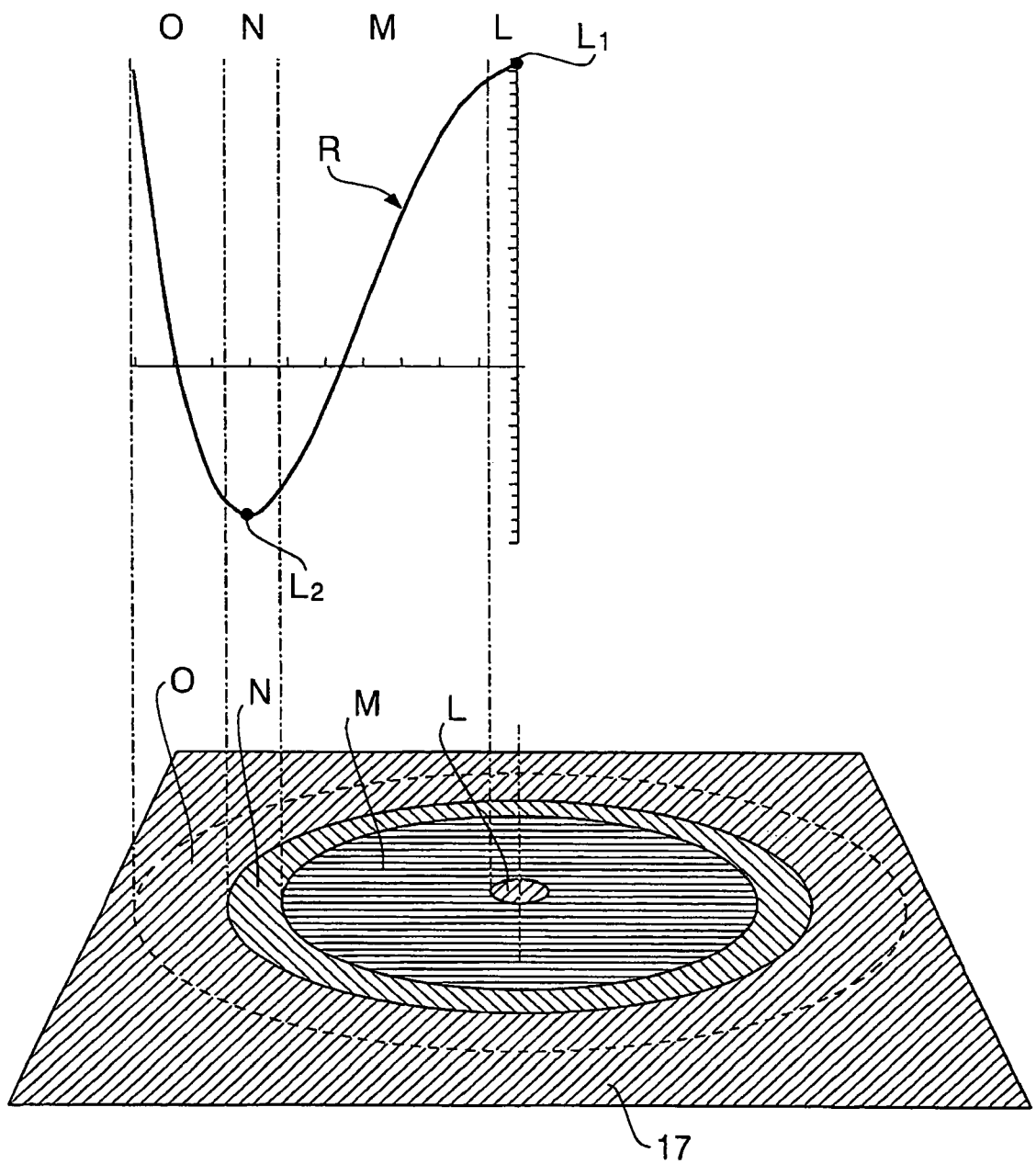
FIGS. 5A and 5B are schematic diagrams showing the configuration of a hologram employed in the embodiment.

FIGS. 5A and 5B are schematic diagrams showing the configuration of the hologram 17 employed in the first embodiment. The curve in the graph of FIG. 5A shows the third-order spherical aberration (SA) in the well-known Zernike polynomial, which is expressed by the following equation (1):

$$SA = 1 - 6\rho^2 + 6\rho^4 \quad (0 \leq \rho \leq 1) \tag{1}$$

where $\rho$ is a parameter indicating the height at which a ray of the light beam traveling from the rectangular prism 16 to the hologram 17 is incident upon the hologram 17. In the graph of FIG. 5A, the vertical axis represents the spherical aberration as a type of wavefront aberration and the horizontal axis represents normalized incident ray height on the hologram 17 (height 1 corresponds to outermost rays). The curved line representing the third-order spherical aberration (SA), which will be called a "curve R", and the extreme values of the curve R will be referred to as an "extreme value $L_1$" ($\rho=0$) and an "extreme value $L_2$" ($\rho=1/\sqrt{2}$). It should be noted that a beam generally exhibits the characteristic as shown in FIG. 5A. That is, any beam exhibits the third-order spherical aberration as shown in FIG. 5A.

FIG. 5B shows the configuration of the hologram 17 on its rectangular prism 16 side. The hologram 17 is made of a phasic hologram element having no polarizing properties, which can be formed by a well-known manufacturing method like patterning. Such a hologram is obtained by superimposing a reference wavefront on a wavefront of a light beam reflected by an object (or a wavefront of a light beam passing through an object) so as to cause interference and then recording the intensity of the interference pattern (interference fringes) on a record medium. In the hologram, the well-known defocus wavefront (spherical wave), tilt wavefront (tilted plane wave), etc. are recorded separately or as a combined interference pattern. The hologram 17 splits the incident beam into a plurality of light beams while giving positive/negative defocus in the optical axis direction to each of the split light beams.

The hologram 17 has four areas L, M, N and O surrounding the optical axis with different diameters. Specifically, as shown in FIG. 5B, the area L is formed in a circular shape, the area M is formed in an annular shape totally surrounding the area L, and the area N is formed in an annular shape totally surrounding the area M. The area other than the areas L, M and N is formed as the area O. In each area, a lot of concavities/convexities having rectangular sectional forms are formed so that the direction of arrangement of the concavities/convexities will differ among the areas. In other words, the areas L, M, N and O of the hologram 17 diffract the incident beam to different directions, respectively.

The dotted circle drawn in FIG. 5B corresponds to a projective figure of the light beam emerging from the rectangular prism 16 toward the hologram 17. Thus, parts of the light beam incident on the hologram 17 enter different areas of the hologram 17 depending on their incident heights (with respect to the optical axis). Each area is defined based on the curve R shown in FIG. 5A. The relationship between the curve R and the areas will be explained later together with an explanation of the composite sensor 20.

The light beam passed through the hologram 17 is split into four beams proceeding in different directions. That is, the four beams are formed by the diffraction/separation by the four areas L, M, N and O of the hologram 17. The four beams proceed in slightly different directions and are incident upon the condensing lens 18 (see FIG. 2). The beams are converged by the condensing lens 18 on separate photoreceptors of the composite sensor 20 which will be explained later. Since each error signal is obtained by an astigmatic method in the first embodiment, the cylindrical lens 19 is placed between the condensing lens 18 and the composite sensor 20. If a light beam having none of the various types of errors (defocus, etc.) is incident on the optical disc 200, and the reflected beam is divided into the four beams which are incident upon the condensing lens 18, each beam is converged into a small circular beam spot on the corresponding photoreceptor. However, if a light beam having some error is incident on the optical disc 200, each of the four beams passed through the hologram 17 and incident upon the condensing lens 18, astigmatism (with an angle 45° from the direction Y shown in FIG. 2) is given to the beam by the cylindrical lens 19, and a beam having a distorted sectional form is received by each photoreceptor.

Figure 6A:
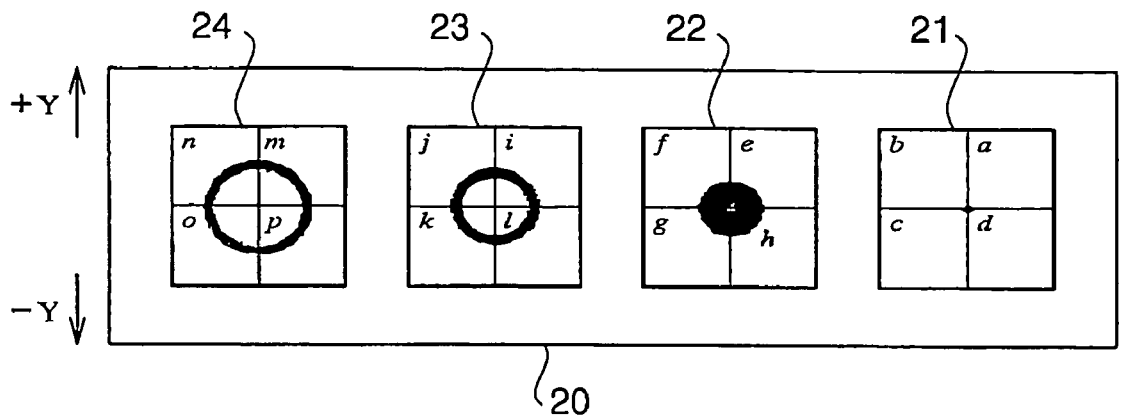
FIGS. 6A through 6C are schematic diagrams showing the configuration of a light receiving side of a composite sensor employed in the embodiment.
Figure 6B:
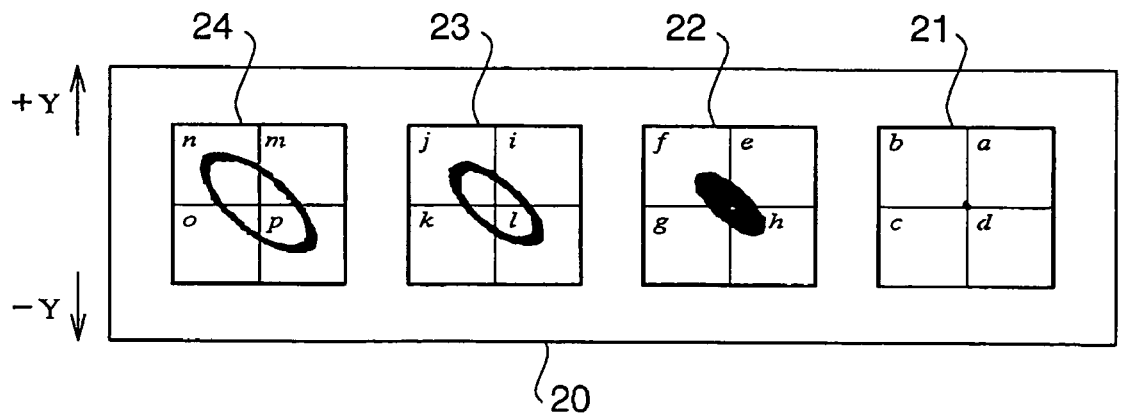
Figure 6C:
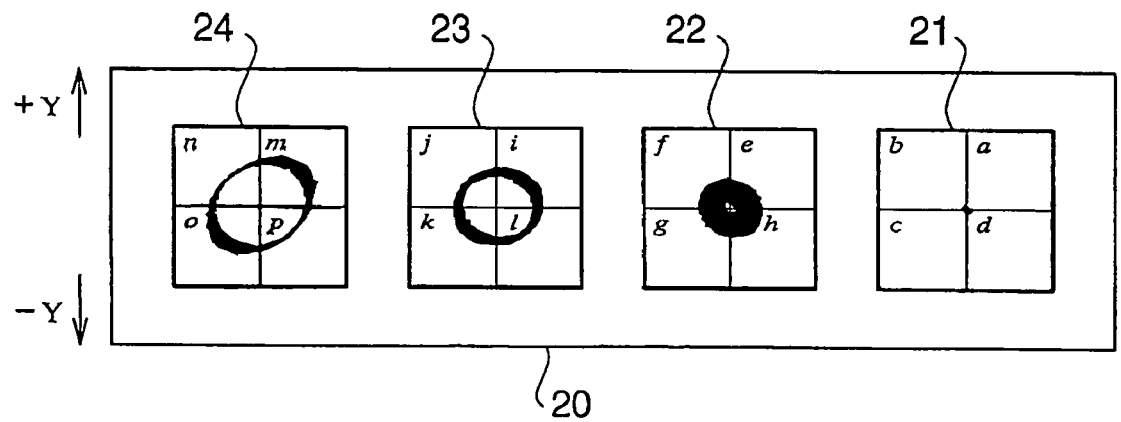

FIGS. 6A through 6C are schematic diagrams showing the configuration of the light receiving side of the composite sensor 20. As shown in FIGS. 6A-6C, the composite sensor 20 includes four photoreceptors 21-24 for receiving the four light beams emerging from the cylindrical lens 19 and converting the beams into electric signals, respectively. The photoreceptor 21 is placed to receive the light beam that passed through the area L of the hologram 17. Similarly, the photoreceptors 22, 23 and 24 are placed to receive the light beams that passed through the areas M, N and O of the hologram 17, respectively. The photoreceptors 21-24 are packaged compactly to be on the same plane orthogonal to the optical axis.

As shown in FIGS. 6A through 6C, each photoreceptor 21-24 has a matrix-like split photoreceptor surface (including four photoreceptor elements) which is segmented into two by a parting line perpendicular to the direction Y (corresponding to the tracking direction) and also segmented into two by another parting line parallel to the direction Y. The photoreceptor 21 includes photoreceptor elements b (left) and a (right) in its upper half and photoreceptor elements c (left) and d (right) in its lower half. The photoreceptor 22 includes photoreceptor elements f (left) and e (right) in its upper half and photoreceptor elements g (left) and h (right) in its lower half. The photoreceptor 23 includes photoreceptor elements j (left) and i (right) in its upper half and photoreceptor elements k (left) and l (right) in its lower half. The photoreceptor 24 includes photoreceptor elements n (left) and m (right) in its upper half and photoreceptor elements o (left) and p (right) in its lower half. In the following description, the reference characters (a, b, c, . . . ) of the photoreceptor elements are also used for expressing the outputs of the photoreceptor elements. The outputs of the photoreceptor elements are input to processing units 30$a$ and 30$b$ shown in FIG. 8, by which the focusing error signal, tracking error signal and spherical aberration signal (indicating the occurrence of the spherical aberration) are detected.

FIG. 6A shows the shape of each beam spot converged on each of the photoreceptors 21-24 when the light beam applied to the optical disc 200 is correctly focused on the recording surface of the disc with no aberration because of the proper thickness of the cover layer of the optical disc 200 and proper positional relationship between the lenses of the beam expander 62. On the photoreceptor 21, part of the light beam that passed through the area L of the hologram 17 forms a circular beam spot. On each of the photoreceptors (22, 23, 24), part of the light beam that passed through each of the area (M, N, O) of the hologram 17 forms an annular beam spot.

FIG. 6B shows the shape of each beam spot converged on each of the photoreceptors 21-24 when the light beam applied to the optical disc 200 is not correctly focusing on the recording surface of the disc. Since the first embodiment is configured to detect various types of errors by means of an astigmatic method, astigmatism is given to each beam (after passing through the hologram 17) by the cylindrical lens 19 when the light beam is not correctly focused on the optical disc 200, by which beam spots having distorted shapes are formed on the photoreceptors 21-24 as shown in FIG. 6B. In the case of FIG. 6B, the light beam incident upon the recording surface of the optical disc 200 focuses at a point in front of the recording surface, therefore, beam spots having leftward rising shapes are formed on the photoreceptors 21-24. On the other hand, in cases where the light beam incident upon the recording surface of the optical disc 200 focuses at a point behind the recording surface, beam spots having rightward rising shapes are formed on the photoreceptors 21-24.

Figure 7A:
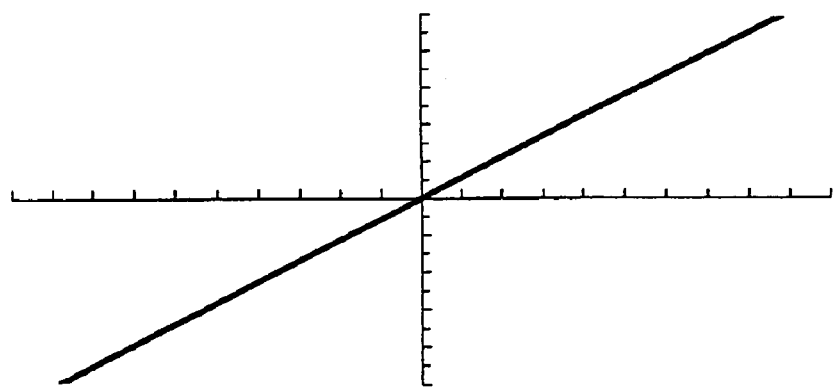
FIGS. 7A through 7C are graphs showing the relationship between the amount of defocus of the light beam incident on a recording surface of the optical disc (with respect to the recording surface) and output signals of photoreceptors.

FIG. 7A is a graph showing the relationship between the amount of defocus of the light beam incident on the recording surface of the optical disc 200 (with respect to the recording surface) and the sum of output signals of the photoreceptors 21 and 23 (i.e., [(a+c)−(b+c)]+[(i+k)−(j+l)]), which corresponds to the shapes of the beam spots on the photoreceptors 21 and 23, in which the vertical axis represents the sum of the output signals of the photoreceptors 21 and 23 and the horizontal axis represents the defocus. According to the graph of FIG. 7A, the sum of the output signals of the photoreceptors 21 and 23 becomes 0 when the defocus is 0.

The graph of FIG. 7A shows the relationship between the defocus and the sum of the output signals of the photoreceptors 21 and 23 (i.e., [(a+c)−(b+c)]+[(i+k)−(j+l)]) in seven cases: when negative spherical aberration is produced (−0.01 λrms, −0.05 λrms, −0.1 λrms);when no spherical aberration exists (0.00 λrms); and when positive spherical aberration is produced (0.01 λrms, 0.05 λrms, 0.1 λrms). However, even if the spherical aberration changed, the shapes of the beam spots on the photoreceptors 21 and 23 show almost no change, and thus the relationship between the defocus and the sum of the output signals remains substantially constant (that is, all the graphs are substantially overlapped). The reason for the constant beam spot shapes will be explained below.

The beam received by the photoreceptor 21 is formed by the part of the light beam that passed through the area L of the hologram 17, and the beam received by the photoreceptor 23 is formed by the part of the light beam that passed through the area N of the hologram 17. Comparing FIGS. 5A and 5B, the area L corresponds to a part of the curve R in the vicinity of the extreme value $L_1$, and the area N corresponds to a part of the curve R in the vicinity of the extreme value $L_2$. In the parts of the curve R in the vicinity of the extreme values $L_1$ and $L_2$, the gradient of the tangent to the curve R is very small, that is, the effect of the change of the spherical aberration to the light passed through and deflected by the areas L and N is very small. The light passed through the areas L and N are insusceptible to the spherical aberration and the shapes of the beam spots formed on the photoreceptors 21 and 23 remain almost constant even if spherical aberration occurred.

Figure 7B:
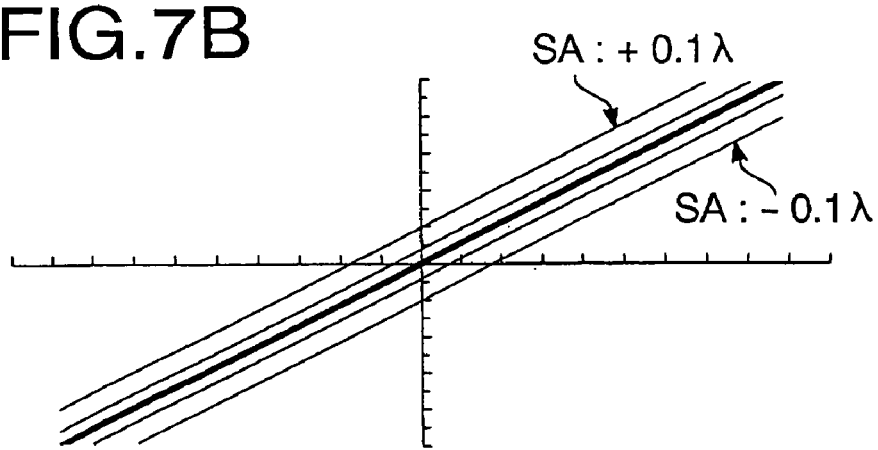

FIG. 7B is a graph showing the relationship between the amount of defocus of the light beam, incident on the recording surface of the optical disc 200 (with respect to the recording surface) and the output signal (i.e., [(e+g)−(f+h)]) of the photoreceptor 22 (which corresponds to the shape of the beam spot on the photoreceptor 22), in which the vertical axis represents the output signal of the photoreceptor 22 and the horizontal axis represents the defocus.

The graph of FIG. 7B shows the relationship between the defocus and the output signal in seven cases: when negative spherical aberration is produced (−0.01 λrms, −0.05 λrms, −0.1 λrms), when no spherical aberration exists (0.00 λrms); and when positive spherical aberration is produced (0.01 λrms, 0.05 λrms, 0.1 λrms). As the spherical aberration changes, the shape of the beam spot on the photoreceptor 22 changes and thereby the relationship between the defocus and the output signal changes. When the spherical aberration increases (changes in the plus direction), the level of the output signal increases (changes in the plus direction) even if the defocus remains constant. The reason for the change of the beam spot shape will be explained below.

The beam received by the photoreceptor 22 is formed by the part of the light beam that passed through the area M of the hologram 17. As understood from FIGS. 5A and 5B, the area M corresponds to a part of the curve R between the aforementioned part in the vicinity of the extreme value $L_1$ and the aforementioned part in the vicinity of the extreme value $L_2$. In the in-between part of the curve R, the gradient of the tangent to the curve R is large, that is, the rate of change of the spherical aberration is large. That is, in this part, when the phase of the beam changes, the spherical aberration changes significantly. Since the area M is susceptible to the spherical aberration, the shape of the beam spot on the photoreceptor 22 changes when a spherical aberration occurs.

Figure 7C:
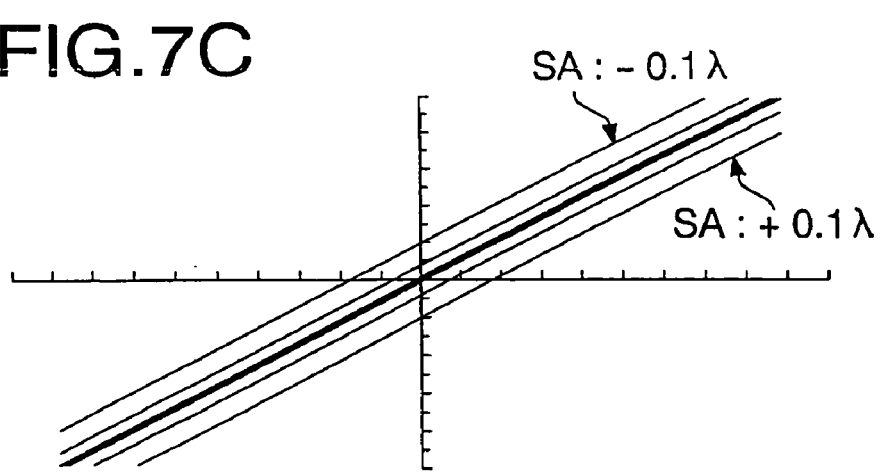

FIG. 7C is a graph showing the relationship between the amount of defocus of the light beam incident on the recording surface of the optical disc 200 (with respect to the recording surface) and the output signal (i.e., [(m+o)−(n+p)] of the photoreceptor 24 (which corresponds to the shape of the beam spot on the photoreceptor 24), in which the vertical axis represents the output signal of the photoreceptor 24 and the horizontal axis represents the defocus.

The graph of FIG. 7C shows the relationship between the defocus and the output signal in seven cases: when negative spherical aberration is produced (−0.01 λrms, −0.05 λrms, −0.1 λrms); when no spherical aberration exists; and when positive spherical aberration is produced (0.01 λrms, 0.05 λrms, 0.1 λrms). As the spherical aberration changes, the shape of the beam spot on the photoreceptor 24 changes and thereby the relationship between the defocus and the output signal changes. When the spherical aberration increases (changes in the plus direction), the level of the output signal decreases (changes in the minus direction) even if the defocus remains constant. The beam received by the photoreceptor 24 is formed by the part of the light beam that passed through the area O of the hologram 17. Since the area O is susceptible to the spherical aberration similarly to the area M, the relationship between the defocus and the output signal changes.

FIG. 6C shows the shape of each beam spot converged on each of the photoreceptors 21-24 when the light beam applied to the optical disc 200 is correctly focused on the recording surface of the disc with an aberration occurring due to improper thickness of the cover layer of the optical disc 200 or improper positional relationship (relative positions, etc.) between the lenses of the beam expander 62. Since the beams passing through the areas L and N are insusceptible to the spherical aberration as mentioned above, beam spots similar to those in FIG. 6A are formed on the photoreceptors 21 and 23 as long as the light beam applied to the optical disc 200 is correctly focused on the recording surface. However, the beams passing through the areas M and O are susceptible to the spherical aberration as mentioned above, and thus beam spots having distorted shapes are formed on the photoreceptors 22 and 24. Therefore, in this embodiment, the focusing error signal and the tracking error signal are detected from the outputs of the photoreceptors 21 and 23 which are insusceptible to the spherical aberration, while the occurrence of the spherical aberration is detected from the outputs of the photoreceptors 22 and 24 which are susceptible to the spherical aberration. In the following, calculation processes for obtaining the error signals will be explained.

Figure 8:
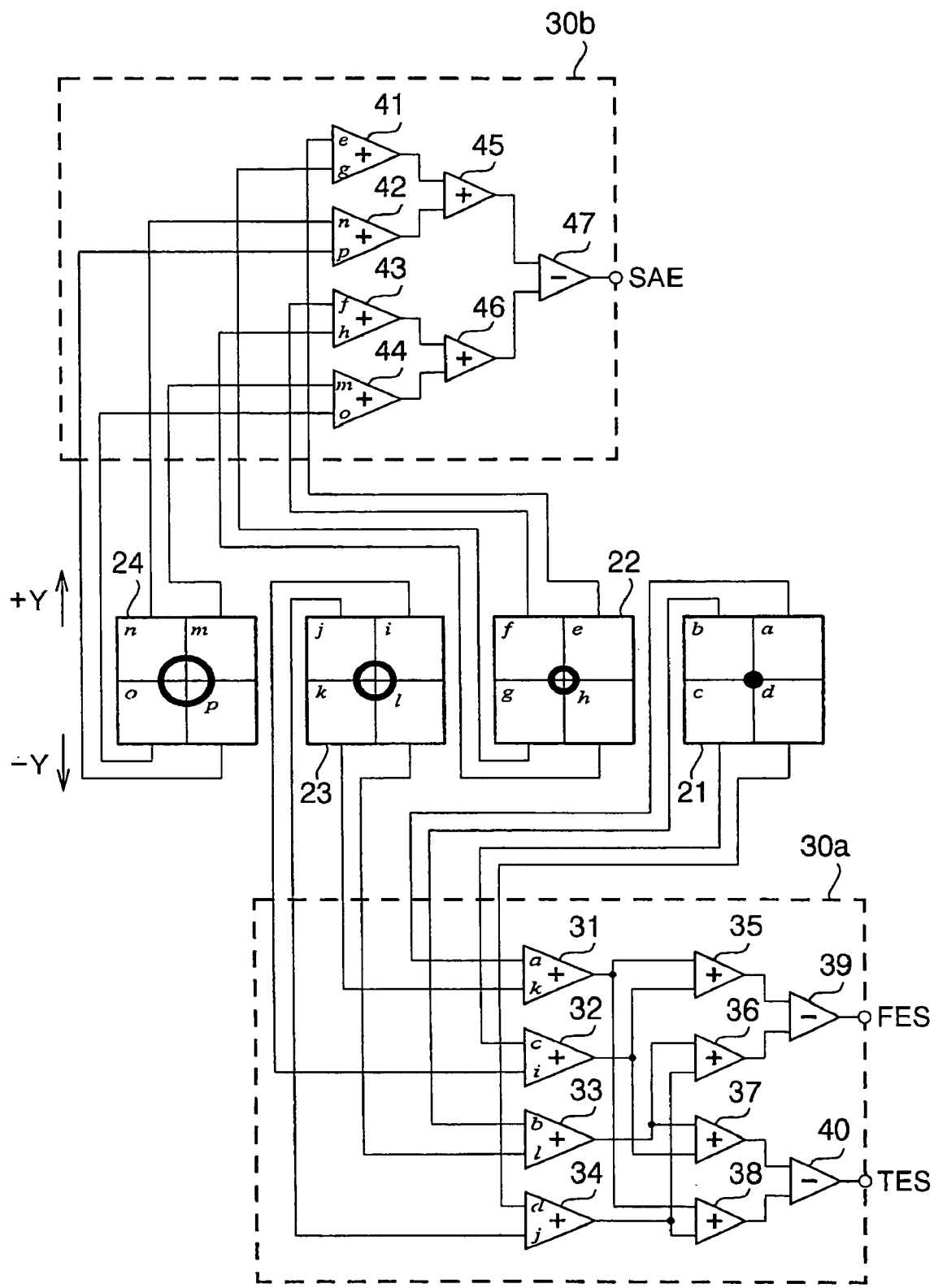
FIG. 8 is a circuit diagram showing electrical connection of photoreceptors and processing units of the optical information read/write device of the embodiment.

As shown in FIG. 8, the processing unit 30a includes a first adder 31, a second adder 32, a third adder 33, a fourth adder 34, a fifth adder 35, a sixth adder 36, a seventh adder 37, an eighth adder 38, a first subtracter 39 and a second subtracter 40. The first adder 31 adds the outputs a and k together, the second adder 32 adds the outputs c and i together, the third adder 33 adds the outputs b and l together, and the fourth adder 34 adds the outputs d and j together. The fifth adder 35 adds the output (a+k) of the first adder 31 and the output (c+i) of the second adder 32 together and inputs the added output (a+k+c+i) to an input terminal of the first subtracter 39. The sixth adder 36 adds the output (b+l) of the third adder 33 and the output (d+j) of the fourth adder 34 together and inputs the added output (b+l+d+j) to the other input terminal of the first subtracter 39. The first subtracter 39 generates the focusing error signal FES by obtaining the difference between the output (a+k+c+i) of the fifth adder 35 and the output (b+l+d+j) of the sixth adder 36.

The seventh adder 37 adds the output (a+k) of the first adder 31 and the output (b+l) of the third adder 33 together and inputs the added output (a+k+b+l) to an input terminal of the second subtracter 40. The eighth adder 38 adds the output (c+i) of the second adder 32 and the output (d+j) of the fourth adder 34 together and inputs the added output (c+i+d+j) to the other input terminal of the second subtracter 40. The second subtracter 40 generates the tracking error signal TES by obtaining the difference between the output (a+k+b+l) of the seventh adder 37 and the output (c+i+d+j) of the eighth adder 38.

When the focusing error signal is detected by the above calculation process, the biaxial actuator 65 moves the object lens 66 in the focusing direction so as to correct the focusing error. When the tracking error signal is detected by the above process, the biaxial actuator 65 moves the object lens 66 in the tracking direction so as to correct the tracking error.

As shown in FIG. 8, the processing unit 30b includes a ninth adder 41, a tenth adder 42, an eleventh adder 43, a twelfth adder 44, a thirteenth adder 45, a fourteenth adder 46 and a third subtracter 47. The ninth adder 41 adds the outputs e and g together, the tenth adder 42 adds the outputs n and p together, the eleventh adder 43 adds the outputs f and h together, and the twelfth adder 44 adds the outputs m and o together. The thirteenth adder 45 adds the output (e+g) of the ninth adder 41 and the output (n+p) of the tenth adder 42 together and inputs the added output (e+g+n+p) to an input terminal of the third subtracter 47. The fourteenth adder 46 adds the output (f+h) of the eleventh adder 43 and the output (m+o) of the twelfth adder 44 together and inputs the added output (f+h+m+o) to the other input terminal of the third subtracter 47. The third subtracter 47 generates the spherical aberration signal SAS by obtaining the difference between the output (e+g+n+p) of the thirteenth adder 45 and the output (f+h+m+o) of the fourteenth adder 46.

When the spherical aberration signal (indicating the degree of spherical aberration) is detected by the above calculation process, the distance between the first lens group 62$a$ and the second lens group 62$b$ is adjusted according to the detected spherical aberration signal as shown in FIGS. 4A-4C, by which the spherical aberration is corrected.

As described above, in the optical information read/write device 100 in accordance with the first embodiment of the present invention, the hologram 17 functioning as a light beam splitting system splits the light beam (incident thereon after being reflected by the optical disc) into beams composed of rays insusceptible to the spherical aberration and beams composed of rays susceptible to the spherical aberration, by which it becomes possible to detect the spherical aberration signal and other error signal making a clear distinction among them without the need of employing subsidiary criteria. By separating the light beam reflected by the optical disc into four beams by use of the hologram 17 which is formed in accordance with the polynomial expressing the third-order spherical aberration (SA) in the Zernike polynomial, the spherical aberration signal and other error signals can be clearly distinguished with high reliability.

In the first embodiment, the focusing error signal and the tracking error signal are calculated based on the sum of the output signals of the photoreceptors 21 and 23 since the relationship between the defocus and the beam spot shape on the photoreceptor 21 behaves similarly to that on the photoreceptor 23 as shown in FIG. 6A. Meanwhile, the spherical aberration signal is detected based on the difference between the output signals of the photoreceptors 22 and 24 since the relationship between the spherical aberration and the beam spot shape on the photoreceptor 22 behaves oppositely to that on the photoreceptor 24 as shown in FIG. 6C. By the configuration described above, the focusing error signal, the tracking error signal and the spherical aberration signal can be detected with high accuracy.

The second embodiment in accordance with the present invention will be described below in detail. In the second embodiment, each signal will be detected by use of one photoreceptor in order to reduce the cost.

Figure 9:
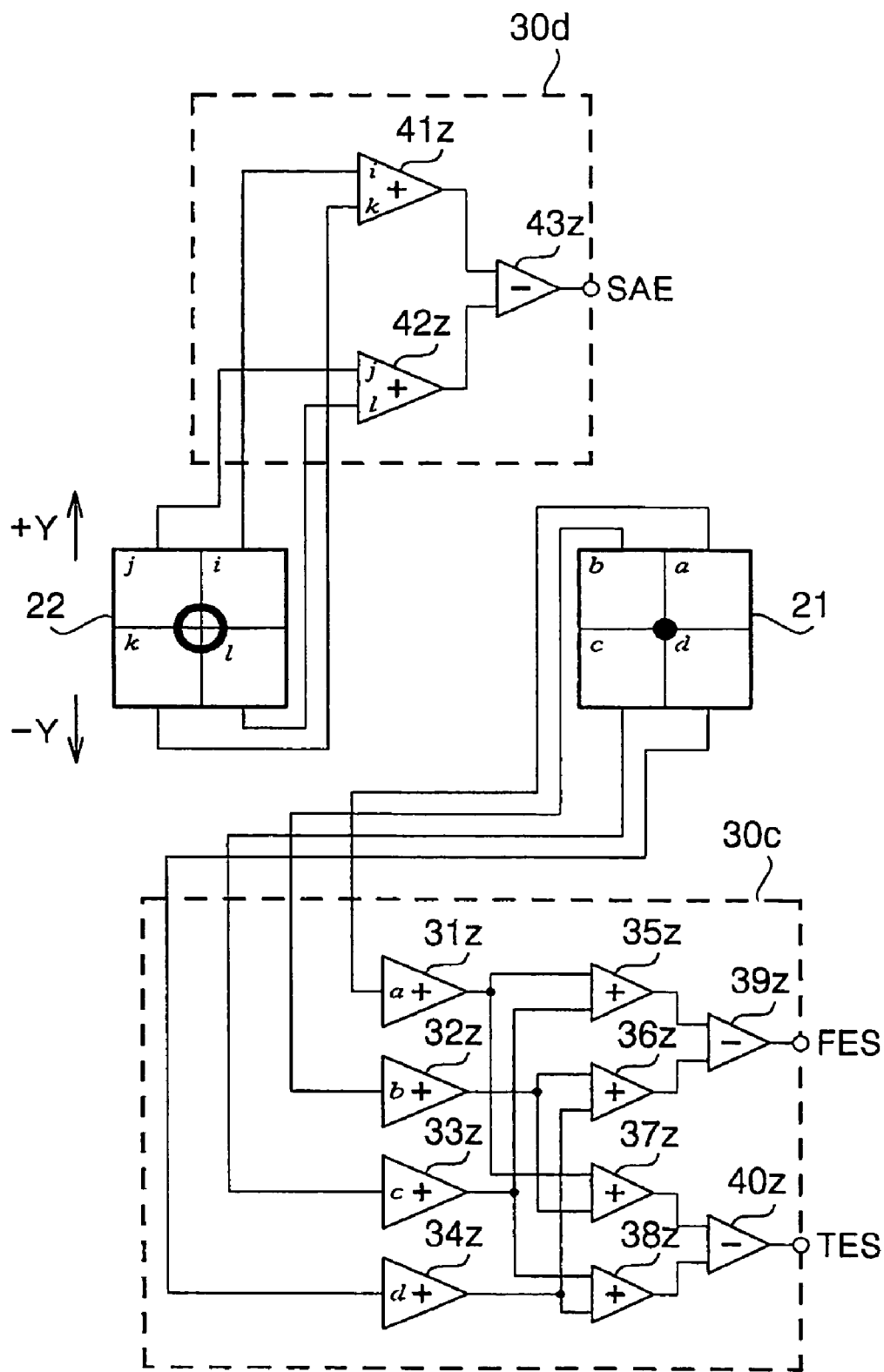
FIG. 9 is a circuit diagram showing electrical connection of photoreceptors and processing units of an optical information read/write device in accordance with another embodiment of the present invention.

FIG. 9 is a circuit diagram showing electrical connection of photoreceptors and processing units of an optical information read/write device in accordance with the second embodiment of the present invention, wherein the same reference numerals as those of the first embodiment designate the same components and thus repeated description thereof is omitted for brevity.

In the composite sensor 20 employed in the second embodiment, a photoreceptor 21 for receiving part of the light beam that passed through the area L of the hologram 17 and a photoreceptor 22 for receiving part of the light beam that passed through the area M of the hologram 17 are packaged so that they will be on a plane orthogonal to the optical axis. In the second embodiment, the focusing error signal and the tracking error signal are detected using the output of the photoreceptor 21 only, while the spherical aberration signal is detected using the output of the photoreceptor 22 only.

As shown in FIG. 9, a processing unit 30$c$ for detecting a focusing error signal FES and a tracking error signal TES includes a first adder 31$z$, a second adder 32$z$, a third adder 33$z$, a fourth adder 34$z$, a fifth adder 35$z$, a sixth adder 36$z$, a seventh adder 37$z$, an eighth adder 38$z$, a first subtracter 39$z$ and a second subtracter 40$z$. The first adder 31$z$ directly outputs the output a of the photoreceptor 21, the second adder 32$z$ directly outputs the output b of the photoreceptor 21, the third adder 33$z$ directly outputs the output c of the photoreceptor 21, and the fourth adder 34$z$ directly outputs the output d of the photoreceptor 21. The fifth adder 35$z$ adds the output a of the first adder 31$z$ and the output c of the third adder 33$z$ together and inputs the added output (a+c) to an input terminal of the first subtracter 39$z$. The sixth adder 36$z$ adds the output b of the second adder 32$z$ and the output d of the fourth adder 34$z$ together and inputs the added output (b+d) to the other input terminal of the first subtracter 39$z$. The first subtracter 39$z$ generates the focusing error signal FES by obtaining the difference between the output (a+c) of the fifth adder 35$z$ and the output (b+d) of the sixth adder 36$z$.

The seventh adder 37$z$ adds the output a of the first adder 31$z$ and the output b of the second adder 32$z$ together and inputs the added output (a+b) to an input terminal of the second subtracter 40$z$. The eighth adder 38$z$ adds the output c of the third adder 33$z$ and the output d of the fourth adder 34$z$ together and inputs the added output (c+d) to the other input terminal of the second subtracter 40$z$. The second subtracter 40$z$ generates the tracking error signal TES by obtaining the difference between the output (a+b) of the seventh adder 37$z$ and the output (c+d) of the eighth adder 38$z$.

As shown in FIG. 9, a processing unit 30$d$ for detecting a spherical aberration signal SAS includes a ninth adder 41$z$, a tenth adder 42$z$ and a third subtracter 43$z$. The ninth adder 41$z$ adds the outputs i and k of the photoreceptor 22 together, and the tenth adder 42$z$ adds the outputs j and l of the photoreceptor 22 together. The third subtracter 43$z$ generates the spherical aberration signal SAS by obtaining the difference between the output (i+k) of the ninth adder 41$z$ and the output (j+l) of the tenth adder 42$z$.

As described above, in the optical information read/write device 100 in accordance with the second embodiment of the present invention, each of the spherical aberration signal and the focusing error signal (& tracking error signal) is detected by use of only one photoreceptor while making a clear distinction between the signals, by which the composition of the optical information read/write head device 100 can be more simplified and the cost can be reduced in comparison with the first embodiment.

While the focusing error signal and the tracking error signal are detected from the beam that passed through the area L in the second embodiment, the signals may also be detected from the beam that passed through the area N. Similarly, while the spherical aberration signal is detected from the beam that passed through the area M in the second embodiment, it is also possible to detect the spherical aberration signal from the beam that passed through the area O.

While the present invention has been described with reference to the particular illustrative embodiments, it is not to be restricted by those embodiments but only by the appended claims. For example, while each error signal is detected by means of the astigmatic method in the above embodiments, the embodiments can also be configured to detect each error signal by means of the so-called spot size method. It is to be appreciated that those skilled in the art can change or modify the embodiments without departing from the scope and spirit of the present invention.

The present disclosure relates to the subject matter contained in Japanese Patent Application No. 2003-150300, filed on May 28, 2003, which is expressly incorporated herein by reference in its entirety.

What is claimed is:

1. A light beam splitting element that splits a beam incident on a beam receiving surface into a plurality of beams,
the beam receiving surface having:
at least one predetermined area that directs a portion of the incident beam to proceed in a predetermined direction, the portion of the beam incident on the one predetermined area being insusceptible to spherical aberration; and
at least another predetermined area that directs another portion of the incident beam to proceed in another predetermined direction, the another portion of the beam incident on the another predetermined area being susceptible to spherical aberration, wherein:
the at least one predetermined area and the at least another predetermined area are defined in accordance with a third-order spherical aberration contained in the incident light beam, the third-order spherical aberration being expressed by a Zernike polynomial:

$$SA=1-6\rho^2+6\rho^4,$$

where, $\rho$ denotes a normalized ray height with respect to the optical axis of the light beam splitting element,
the portion of the beam susceptible to the spherical aberration corresponds to a non-extreme value of the polynomial, and
the portion of the beam insusceptible to the spherical aberration corresponds to a vicinity of an extreme value of the polynomial.

2. The light beam splitting element according to claim 1, which allows light to pass therethrough, the plurality of beams split by the light beam splitting element emerging therefrom in different directions, respectively.

3. The light beam splitting element according to claim 1,
wherein the at least one predetermined area includes a first circular area surrounding the optical axis; and
wherein the at least another predetermined area includes a second annular area surrounding the first circular area.

4. The light beam splitting element according to claim 3,
wherein the at least one predetermined area further includes a third annular area surrounding the second annular area; and
wherein the at least another predetermined area further includes a fourth area surrounding the third circular area.

5. An optical unit employed in an optical information read/write device for reading/writing information from/on an optical disc, comprising:
a light source that emits a laser beam;
an optical system that shapes and directs the laser beam emitted by the light source to the optical disc;
a beam splitting element provided to the optical system;
a plurality of photo receptors, the laser beam reflected by the optical disc being received through the optical system, incident on the beam splitting element, the beam splitting element having a beam receiving surface and splitting the beam incident on the beam receiving surface into a plurality of beams,
the beam receiving surface having:
at least one predetermined area that directs a portion of the incident beam to proceed in a predetermined direction, the portion of the beam incident on the one predetermined area being insusceptible to spherical aberration; and
at least another predetermined area that directs another portion of the incident beam to proceed in another predetermined direction, the another portion of the beam incident on the another predetermined area being susceptible to spherical aberration, wherein:
the at least one predetermined area and the at least another predetermined area are defined in accordance with a third-order spherical aberration contained in the incident light beam, the third-order spherical aberration being expressed by a Zernike polynomial:

$$SA=1-6\rho^2+6\rho^4,$$

where, $\rho$ denotes a normalized ray height with respect to the optical axis of the light beam splitting element,
the portion of the beam susceptible to the spherical aberration corresponds to a non-extreme value of the polynomial, and
the portion of the beam insusceptible to the spherical aberration corresponds to a vicinity of an extreme value of the polynomial.

6. The optical unit according to claim 5, which allows light to pass therethrough, the plurality of beams split by the light beam splitting element emerging therefrom in different directions, respectively.

7. The optical unit according to claim 5,
wherein the at least one predetermined area includes a first circular area surrounding the optical axis; and
wherein the at least another predetermined area includes a second annular area surrounding the first circular area.

8. The optical unit according to claim 7,
wherein the at least one predetermined area further includes a third annular area surrounding the second annular area; and
wherein the at least another predetermined area further includes a fourth area surrounding the third circular area.

9. The optical unit according to claim 5,
wherein the plurality of photoreceptors include:
at least one photoreceptor that receives the portion of the beam insusceptible to the spherical aberration; and
at least another photoreceptor that receives the portion of the beam susceptible to the spherical aberration.

10. The optical unit according to claim 9,
wherein the spherical aberration is detected based on a signal is obtained in accordance with the output of the at least another photoreceptor.

11. The optical unit according to claim 10,
wherein a focusing error signal is obtained in accordance with the output of the at least one photoreceptor.

12. The optical unit according to claim 10,
wherein a tracking error signal is obtained in accordance with the output of the at least one photoreceptor.

13. A light beam splitting system, comprising a plurality of areas surrounding an optical axis and having different diameters, the plurality of areas being formed such that an incident light beam that is incident on the light beam splitting system is divided into at least an beam composed of rays insusceptible to spherical aberration and other beam composed of rays susceptible to the spherical aberration, wherein:
a third-order spherical aberration contained in the incident light beam is expressed by a Zernike polynomial as:

$$SA=1-6\rho^2+6\rho^4,$$

where, $\rho$ denotes a normalized ray height with respect to the optical axis, the beam composed of rays insusceptible to the spherical aberration is a beam composed of rays that passed through one of the areas that corresponds to a vicinity of an extreme value of the polynomial, and the beam composed of rays susceptible to the spherical aberration is a beam composed of rays that passed through one of the areas that corresponds to a non-extreme value of the polynomial.

14. The light beam splitting system according to claim 13, wherein the polynomial has a first extreme value and a second extreme value; and wherein the light beam splitting system splits the incident light beam into a beam composed of rays that passed through a first area that corresponds to a vicinity of the first extreme value of the polynomial, a beam composed of rays that passed through a second area that corresponds to a vicinity of the second extreme value of the polynomial, and two beams composed of rays that passed through areas corresponding to non-extreme values of the polynomial, respectively.

15. An optical information read/write device for reading/writing optical information by leading a light beam emitted by a light source into a recording surface of an optical disc, comprising:

a light beam splitting system including a plurality of areas surrounding an optical axis with different diameters, the plurality of areas being formed such that an incident light beam that is incident on the light beam splitting system is divided into at least an beam composed of rays insusceptible to spherical aberration and other beam composed of rays susceptible to the spherical aberration, the beam and the other beam proceeding in different directions: and at least two photoreceptors which receive the beams split by the light beam splitting system to proceed in different directions, respectively, wherein:

a third-order spherical aberration contained in the incident light beam is expressed by a Zernike polynomial as:

$SA=1-6\rho^2+6\rho^4$, where, $\rho$ denotes a normalized ray height with respect to the optical axis, the beam composed of rays insusceptible to the spherical aberration is a beam composed of rays that passed through one of the areas that corresponds to a vicinity of an extreme value of the polynomial, and the beam composed of rays susceptible to the spherical aberration is a beam composed of rays that passed through one of the areas that corresponds to a non-extreme value of the polynomial.

16. The optical information read/write device according to claim 15, wherein at least one of the photoreceptors receives the beam composed of rays insusceptible to the spherical aberration a focusing error of the light beam emitted by the light source with respect to the recording surface of the optical disc being detected in accordance with the output of the at least one photoreceptors corresponding to the beam composed of rays insusceptible to the spherical aberration, and wherein at least another one of the photoreceptors receives the beam composed of rays susceptible to the spherical aberration, the spherical aberration of the light beam emitted by the light source occurring on the recording surface of the optical disc being detected in accordance with the output of the at least another one of the photoreceptors corresponding to the beam composed of rays susceptible to the spherical aberration.

17. The optical information read/write device according to claim 16, wherein the polynomial has a first extreme value and a second extreme value; and wherein the light beam splitting system splits the incident light beam into a beam composed of rays that passed through a first area that corresponds to a vicinity of the first extreme value of the polynomial, a beam composed of rays that passed through a second area that corresponds to a vicinity of the second extreme value of the polynomial, and two beams composed of rays that passed through areas corresponding to non-extreme values of the polynomial, respectively.

18. The optical information read/write device according to claim 17, wherein the photoreceptors detect error signals by use of an astigmatic method, and wherein two of the photoreceptors receive the two beams composed of rays that passed through the areas corresponding to the vicinities of the first and second extreme values of the polynomial, respectively, a focusing error signal being detected in accordance with output signals of the two photoreceptors.

19. The optical information read/write device according to claim 17, wherein the photoreceptors detect error signals by use of an astigmatic method, and wherein two of the photoreceptors receive two beams composed of rays that passed through the areas corresponding to non-extreme value of the polynomial, respectively, the spherical aberration signal is detected in accordance with a difference between output signals of the two photoreceptors.

20. A light beam splitting system comprising at least four areas surrounding an optical axis and having different diameters, wherein, when a light beam is incident on the light beam splitting system, portions of the light beam respectively incident on different ones of the four areas are diffracted in different directions, wherein the at least four areas are defined in accordance with a third-order spherical aberration contained in the incident light beam, the third-order spherical aberration being expressed by a Zernike polynomial:

$SA=1-6\rho^2+6\rho^4$, where, $\rho$ denotes a normalized ray height with respect to the optical axis of the light beam splitting element.

* * * * *